United States Patent [19]
Baxter et al.

[11] 4,306,304
[45] Dec. 15, 1981

[54] DIGITAL LOOP SYNCHRONIZATION CIRCUIT

[75] Inventors: Leslie A. Baxter, Eatontown; Peter Cummiskey, Clark, both of N.J.

[73] Assignee: Bell Telephone Laboratories, Incorporated, Murray Hill, N.J.

[21] Appl. No.: 62,425

[22] Filed: Jul. 31, 1979

[51] Int. Cl.³ .............................................. H04J 3/06
[52] U.S. Cl. .................................... 370/108; 370/79; 370/86
[58] Field of Search .................. 370/108, 102, 86, 19, 370/60, 94, 80, 79; 375/116

[56] References Cited
U.S. PATENT DOCUMENTS

| | | | |
|---|---|---|---|
| 3,681,759 | 8/1972 | Hill | 370/86 |
| 3,919,484 | 11/1975 | Maxemchur | 370/79 |
| 4,071,706 | 1/1978 | Warren | 370/94 |
| 4,158,748 | 6/1979 | En | 178/69.1 |

Primary Examiner—David L. Stewart
Attorney, Agent, or Firm—David H. Tannenbaum

[57] ABSTRACT

There is disclosed a digital loop circuit for controlling synchronization around a closed loop communication system. The control circuit is designed to automatically adjust the delay of the loop to maintain a constant frame bit length without regard to the number of stations connected into the loop. As stations are added or subtracted from the loop, the system operates to add or subtract delay as necessary. A FIFO register having a bit capacity equal to the frame size is inserted serially in the loop and a separate clock is used to control the input and the output of the FIFO register. If a unique frame bit is not received in the anticipated position the output FIFO clock skips one count per frame thereby adding delay to the loop. The loop control circuit operates for situations where the framing bit is on a separate channel and also when the framing bit is on the actual data channel.

7 Claims, 9 Drawing Figures

DIGITAL LOOP SYNCHRONIZATION CIRCUIT

BACKGROUND OF THE INVENTION

This invention relates to a digital loop communication system and more particularly to a synchronization system for use in such a system.

DISCUSSION OF THE PROBLEM

In essence, the problem is to design a digital loop communication system having the capability of easily adding and subtracting stations from the loop while at the same time maintaining synchronization around the loop regardless of the number of stations in the loop at any given time. Since each station is assigned to a particular bit position in the digital stream it is critical that at the completion of one complete frame a given bit position be presented to the proper station. This is termed loop synchronization and it is clear that as stations are added or subtracted, time delays must be added or subtracted from the loop is synchronization is to be maintained.

One method of accomplishing such time padding is to use a multi-delay shift register and tap the various outputs depending upon the length of the loop desired. While such a system could work, it has the drawback of requiring external manipulation of the shift register with manually operated switches or with central processing control. In either event, maintaining synchronism becomes an expensive proposition.

Another method of synchronization is given by Maxemchuk in U.S. Pat. No. 3,919,484, which patent discloses a dual shift-register technique. One bank of registers is used to hold data and another bank of registers contains "marker bits" which control the speed of clocking of the data register. Control circuitry manipulates these marker bits until the system is synchronized. This technique operates automatically (without external intervention), however, it requires a relatively large amount of hardware and is fairly slow to detect and correct out-of-sync conditions.

SUMMARY OF THE INVENTION

These and other problems are solved utilizing our invention where a digital loop control circuit automatically adjusts the delay of the digital closed loop. As stations are subtracted or added from the loop, the proposed system operates to add or subtract delay as necessary. A FIFO register, having a bit capacity equal to the frame size, is inserted serially in the loop and a separate clock is used to control the input and the output of the FIFO register. Each frame is arranged with a frame bit in an expected position. If the frame bit is not received in the anticipated position the output FIFO clock skips one count per frame until the frame bit is received thereby adding delay to the loop. If the FIFO fills up, it is reset and the process continues until the correct synchronizing delay is achieved. The loop control circuit operates for situations where the frame bit is on a separate channel and also when the frame bit is on the actual data channel.

BRIEF DESCRIPTION OF THE DRAWING

These and other objects, features and problems are solved in one embodiment of our invention in the drawing, in which.

GENERAL DESCRIPTION

Figure 1:
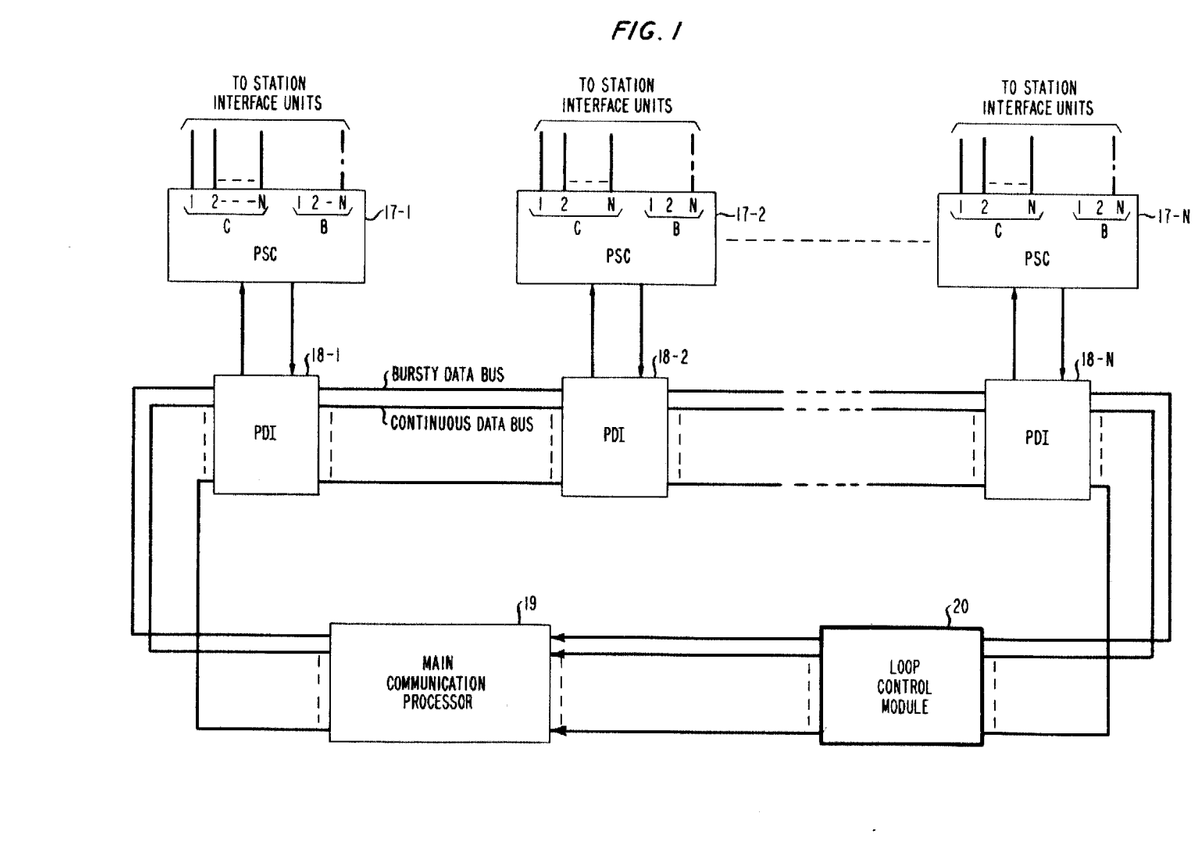
FIG. 1 is a block diagram of the entire system.

The loop control module of our invention is designed for use in a digital loop system, such as for example the system shown and described in commonly assigned copending patent applications of Baugh-Smith, Ser. Nos. 62,422 and 62,423 filed concurrently herewith. These patent applications are hereby incorporated by reference and made a part hereof as though fully reproduced herein. For an understanding of the context of the invention, as shown in FIG. 1, the reader is referred to the copending patent applications. In general, however, it is desired to communicate digital data bits around a closed loop between any number of stations. Stations may be added or removed from the loop from time to time and the loop must compensate for such additions or subtractions. Since the time it takes a particular data bit to traverse the entire loop is dependent upon the number of stations (length) of the loop our invention is directed to the problem of maintaining synchronism of the data bits around a closed digital loop without need for external control.

DETAILED DESCRIPTION

The following will describe in detail the operation of loop control module (LCM) 20. LCM 20 performs four basic functions: generation of clock and frame signals; auto-zeroing on the continuous data bus; garbage collection on the bursty data bus; and maintaining the proper loop delay so that the system remains synchronized.

Figure 2:
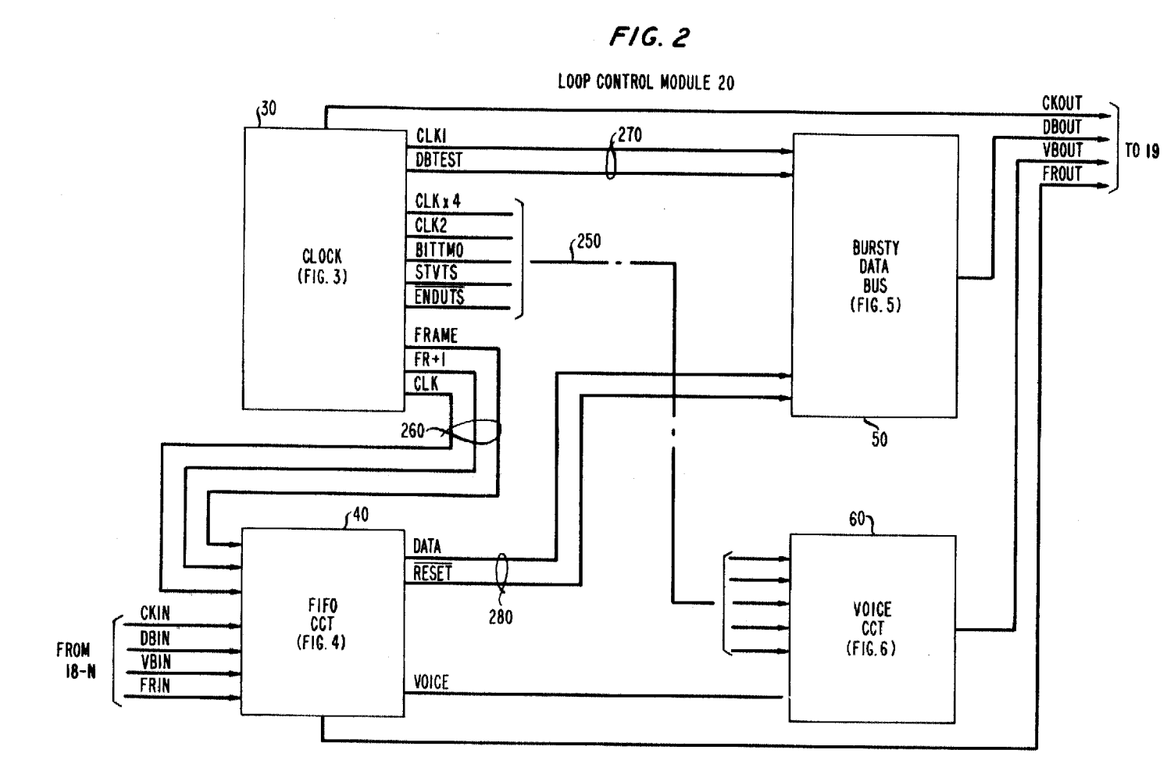
FIG. 2 is a block diagram of the loop control module.
Figure 3:
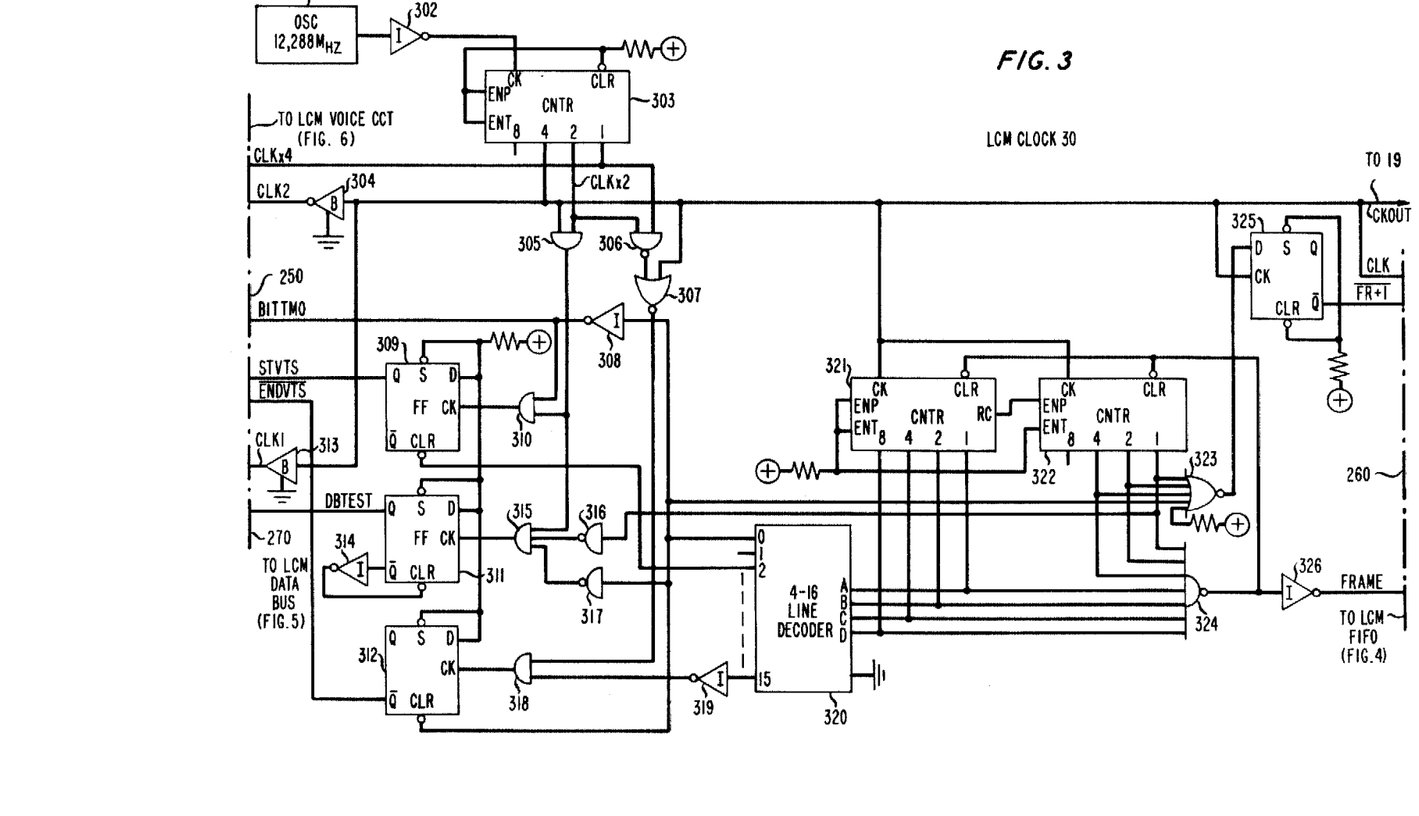
FIGS. 3 through 6 are schematic diagrams.
Figure 9:
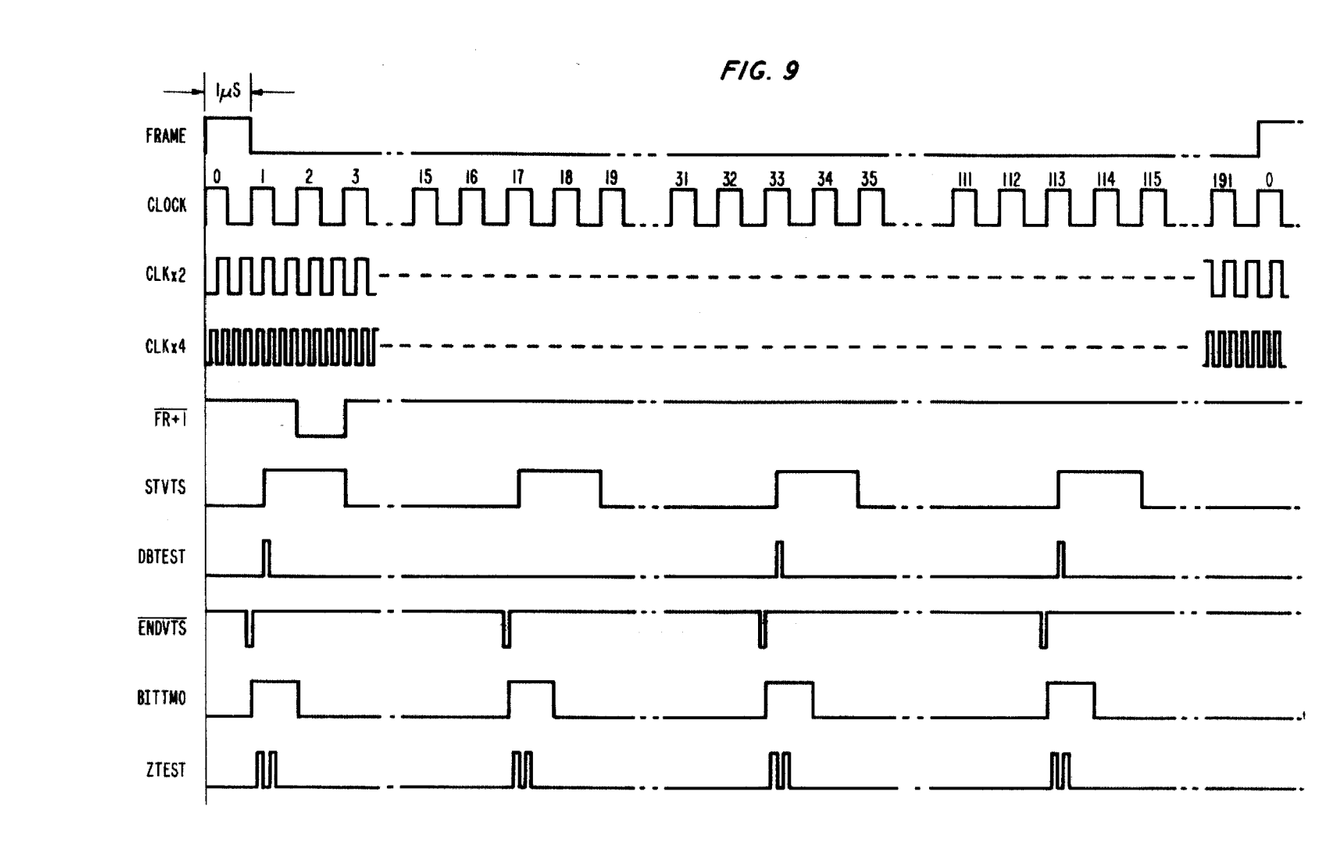
FIG. 9 is a timing diagram.

Referring to FIG. 2, the clock and frame generation are performed by clock circuit 30. As indicated in FIG. 3, these functions are performed in a standard way using TTL integrated circuits. The timing of the signals generated by the clock circuit is shown in FIG. 9. The function of these signals is as follows:

FRAME: marks the beginning of each frame on both the continuous and bursty data buses. Occurs once every 192 CLOCK's.

CLOCK: the basic bit clock used throughout the system.

CLKX2, CLKX4: higher speed versions of CLOCK.

$\overline{FR+1}$: A signal which appears early in each frame—used to set a flip-flop.

STVTS: marks the start of each time slot on the continuous data bus. Occurs every 16 CLOCKS.

DBTEST: marks the end of each time slot on the bursty data bus. Occurs every 32 CLOCKS.

$\overline{ENDVTS}$: marks the end of each time slot on the continuous data bus. Occurs every 16 CLOCKS.

BITTM0: occurs during the first clock cycle of each continuous data time slot.

Z TEST: occurs at the end of each time slot on the continuous bus and is used to check if the time slot has a zero value.

The use of each of these signals will be explained in the discussions which follow.

CONTINUOUS DATA BUS CIRCUITRY

The continuous data bus consists of a repetitive sequence of 12 time slots, each consisting of 16 clocks. In this implementation, the time slots are used to contain linear PCM voice samples. Thus, a single continuous data bus can permit up to 12 simultaneous voice conversations.

Unlike an analog bus, the digital voice bus described above has no loss (or attenuation), hence the effects of random bit errors will persist until the system is powered down. Also, the bus tends to contain random bit patterns when it is initially powered up, and these will also persist.

In order to damp out the effects of bit errors, it is necessary to make the bus slightly lossy (similar to a leaky capacitor in an analog bus). This is done by the voice circuit 60 in FIG. 2. A schematic of this circuit is given in FIG. 6. When the continuous data bus is used for high-speed data other than linear PCM voice samples, this circuit is omitted.

Figure 6:
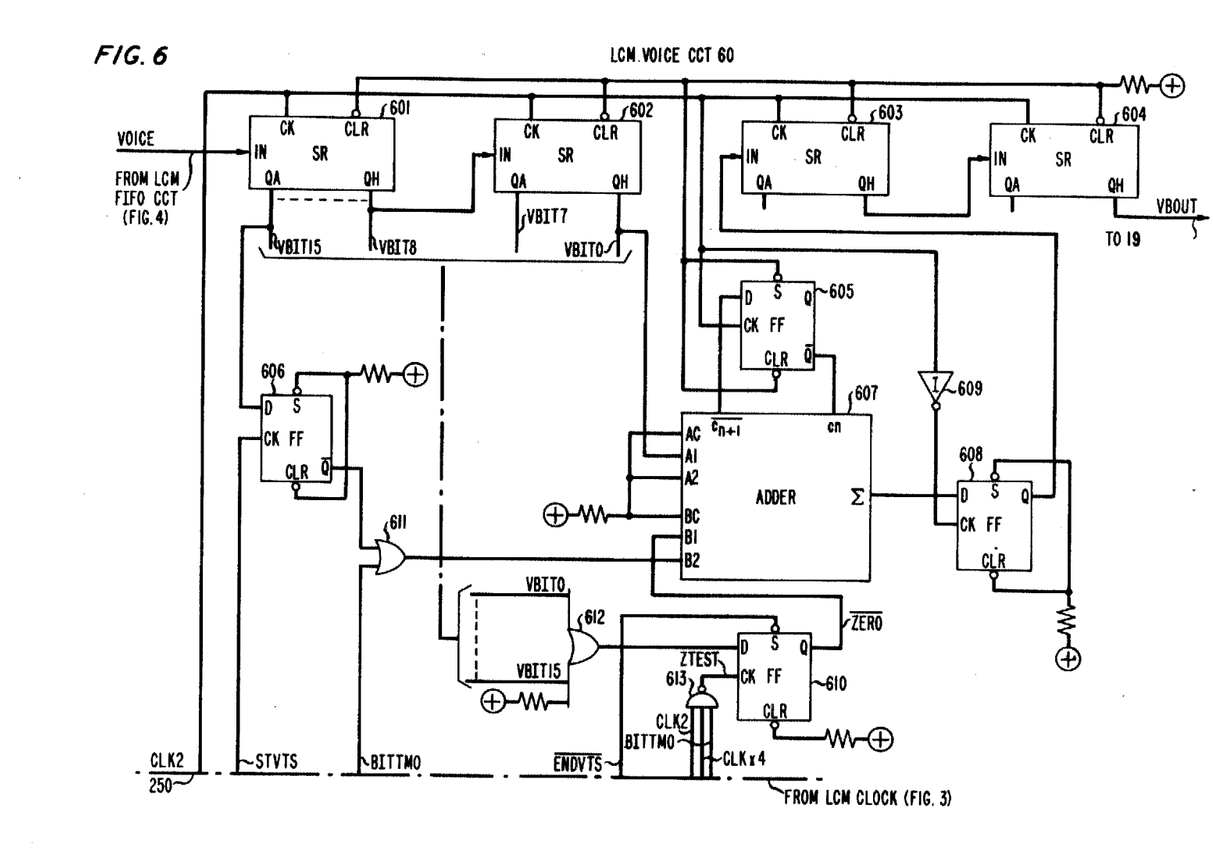
Figure 7:
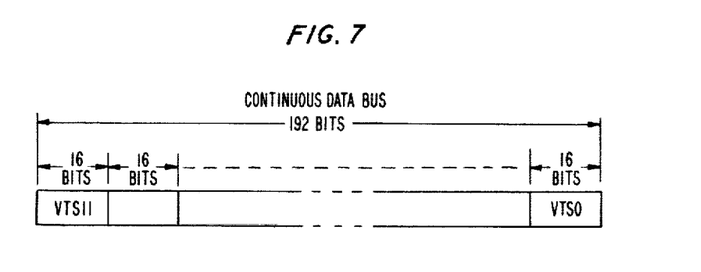
FIG. 7 illustrates the frame structure of the continuous data bus.

The circuit of FIG. 6 implements the following algorithm: if the contents of a particular time slot are negative, its value is increased by 1; if the contents of the time slot are positive, its value is decreased by 1; if the value of the time slot is zero; it remains unchanged. Thus, the value of each time-slot is continuously forced towards zero, and the effect of bit errors is damped out. Since the voice samples are in the form of linear PCM, the addition and subtraction are easily performed. Using 2's complement arithmetic, subtracting 1 is accomplished by adding a sequence of 16 1's to the time slot.

With reference to FIG. 6, serial adder 607 performs the actual addition and subtraction. Registers 601 and 602 hold the voice sample to be processed. At the start of the time slot (STVTS), flip-flop 606 latches up the value of bit 15 of the time slot. This bit indicates whether the value of the time slot is positive or negative. If the value of the time slot is positive, the $\overline{Q}$ output of flip-flop 606 will be high, and a sequence of 16 ones (−1 in 2's complement notation) will be added to the time slot as it is shifted by. If, however, the time slot was negative, then the output of gate 611 will go high only while BITTM0 is asserted (i.e., during the first clock cycle of the time slot) and a single 1 is added to the least significant bit position of the time slot. If the value of the time slot is identically zero, then the output of gate 612 will be low at the time of the first rising edge of ZTEST. This will cause the $\overline{ZERO}$ signal to be latched at zero and prevent anything from being added to the time slot. Thus, the circuit of FIG. 6 implements the algorithm described above.

In systems which have more than one continuous data bus, the circuit of FIG. 6 is simply replicated for each additional bus.

BURSTY DATA BUS CIRCUITRY

Figure 8:
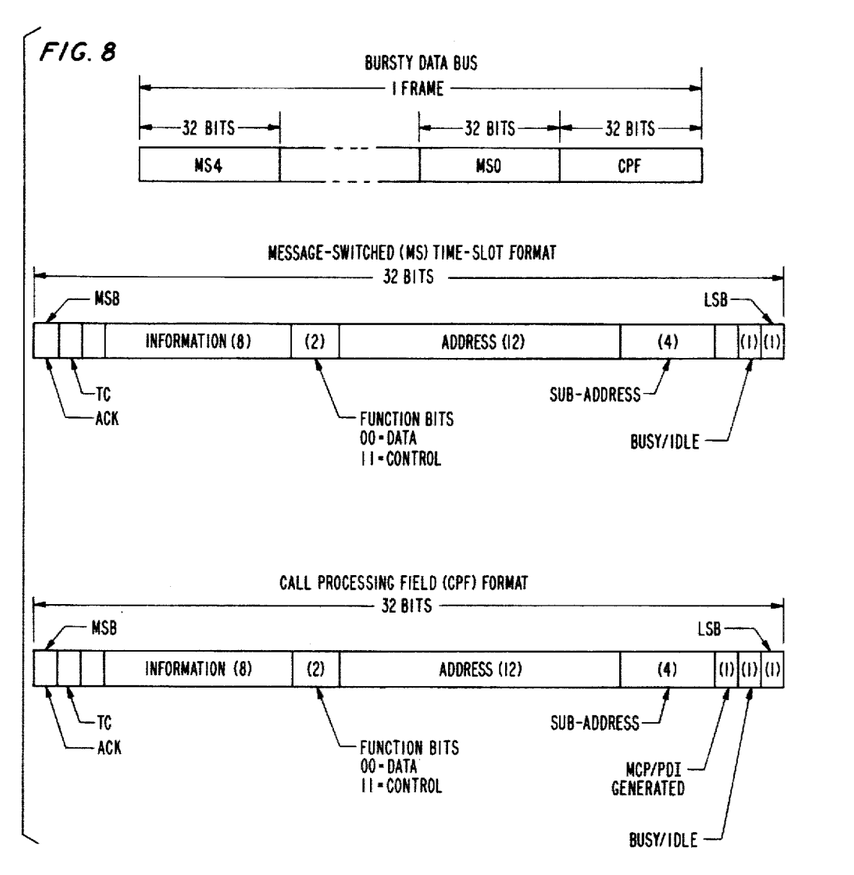
FIG. 8 illustrates the frame structure of the bursty data bus.

As shown in FIG. 8, the bursty data bus consists of six 32-bit time slots. While the message-switched time-slots and the call processing field have different functions in the system as far as the LCM is concerned all six of the bursty data bus time slots are identical. The function of the LCM bursty data bus circuit (element 50 in FIG. 2) is two-fold: (1) to remove traffic from the bursty data bus (i.e., zero out the time slot) after it has been delivered; and (2) to locate and remove any undeliverable traffic.

The LCM utilizes three bits of each time slot to carry out these functions: the BUSY/IDLE (B/I), Traffic Control (TC) and Acknowledgement (ACK) bits. The relative positions of these bits in a time slot is shown in FIG. 8. When a programmable data interchanger (PDI) transmits in a time slot, it sets the B/I bit to indicate that the time slot is in use. When the destination PDI receives the time slot, it sets the ACK bit. When the LCM detects a time slot with both the B/I and ACK bits set, the time-slot is cleared so that it can be used again. If the LCM detects a time slot with B/I set, but neither ACK nor TC set, it sets the TC bit to indicate that the time slot has passed by the LCM once. If a time slot is detected with the B/I and TC bits set, and ACK is not set, this indicates that the time slot has made at least one full trip around the loop without being received and acknowledged. Therefore, it is considered to be undeliverable and the time slot is cleared out.

Figure 5:
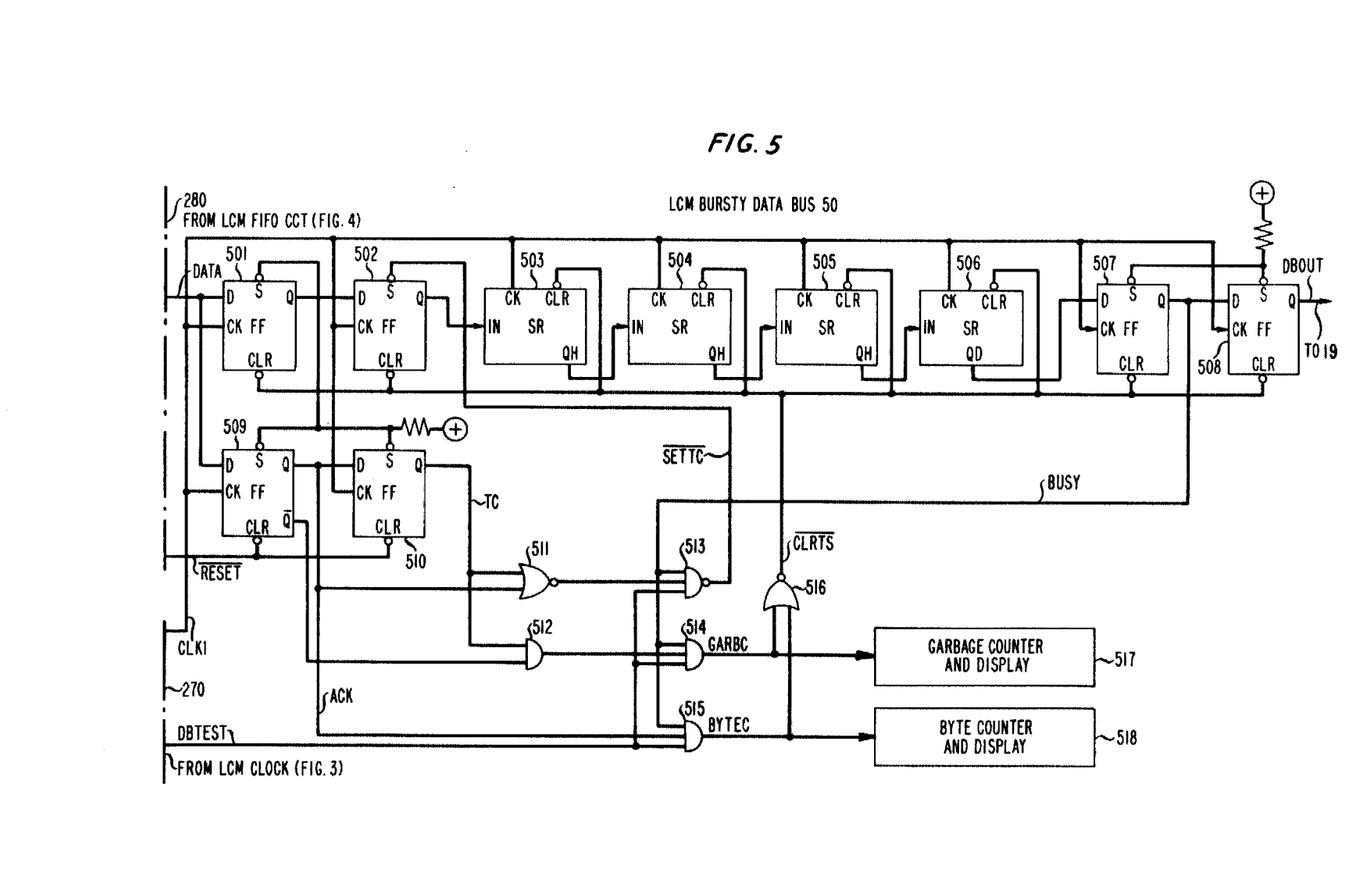

The data bus circuit 50, shown in FIG. 5 performs the above-described functions. Data from the data bus is shifted through flip-flops 501 and 502, registers 503–506, and flip-flops 507 and 508. At the time that DBTEST is asserted (shown in FIG. 9), a complete data time slot is contained between flip-flops 501 and 508. The ACK and TC bits are replicated in flip-flops 509 and 510, respectively, to prevent race conditions. The B/I bit (BUSY) is available at flip-flop 507. The combination of gates 511 through 516 perform the comparisons described above when they are strobed by DBTEST. When a properly acknowledged time slot is detected, BYTEC is asserted, causing the time slot to be cleared ($\overline{CLRTS}$) and also incrementing byte counter 518. The byte counter is useful for measuring the traffic handled by the system. When an undeliverable time slot is detected, GARBC is asserted, which causes the time slot to be cleared and increments garbage counter 517. The garbage counter is useful for maintaining the system in proper operating condition. A non-zero reading on the garbage counter usually indicates a malfunction somewhere in the system. When a time slot with BUSY asserted, but neither TC nor ACK asserted, is encountered, $\overline{SETTC}$ is asserted, causing the TC bit to be set.

In this manner, the LCM Bursty Data Bus Circuit prevents the data bus from filling up with garbage and keeps statistics relating to the systems performance.

LOOP SYNCHRONIZATION CONTROL CIRCUIT

As discussed previously, the number of bits delay around the loop must equal the number of bits per frame (N) if the system is synchronized. In a loop system with N bits per frame, there will not always be exactly N stations connected to the loop. In this particular implementation, the LCM has a minimum delay of 32 bits, each PDI has a delay of 1 bit, and the frame length is 192 bits. If there are m PDI's in the loop, then the LCM must provide a delay d of:

$$d = 192 - 32 - m$$

For example, if there are 61 PDI's in the loop, the LCM must provide a delay of 99 bits.

Since the loop synchronization control circuit is implemented with a FIFO, the operational characteristics of a FIFO will now be briefly described. A FIFO (First In-First Out serial memory) is a shift register with separate clocks for the input and output. Bits of data clocked into the FIFO bubble through to the unoccupied storage location nearest the output. When the FIFO output is clocked, the oldest data bit exits the FIFO and all the other data bits move one slot closer to the output.

As illustrated in FIGS. 1 and 2, our particular implementation uses separate buses for the transmission of continuous data, bursty data, clock, and framing information. The frame bus contains only the frame pulse, which occurs every 192 clock periods (FIG. 9). the circuit of FIG. 4 uses a FIFO (410 and 411) as an adaptively variable delay which can be used to adjust the loop length. The basic principle of operation of the circuit is that, if the system is in sync, the previous frame pulse should emerge from the FIFO at the same time as the new frame pulse is generated. FIFO's 410 and 411 are arranged in a standard configuration such that the two 96-word FIFO's become a single 192-word FIFO.

Figure 4:
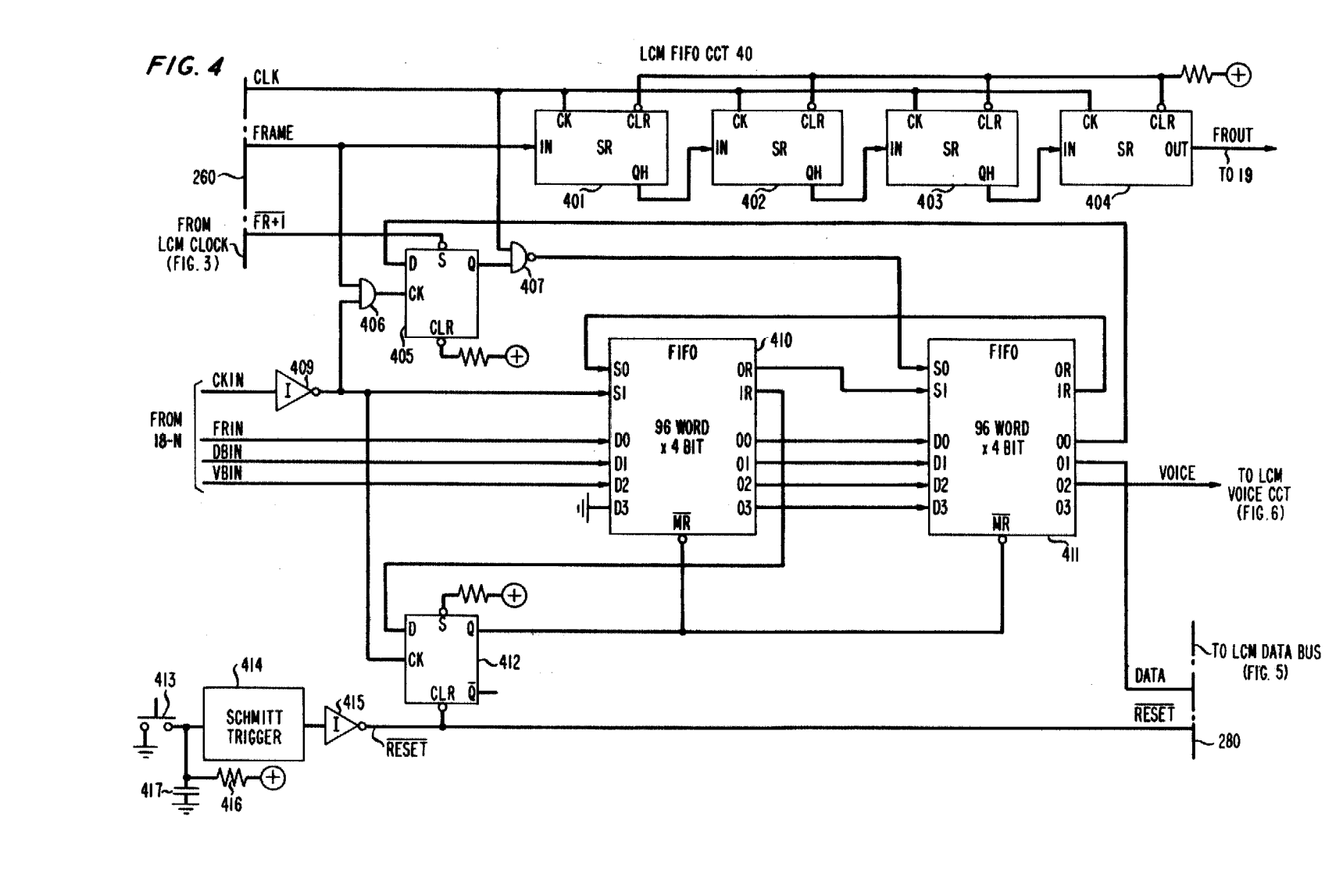

The circuit illustrated in FIG. 4 operates in the following manner. Flip-flop 405, in conjunction with gate 406 tests the frame bit emerging from the FIFO against the new frame bit being generated. If the system is in sync, the Q output of flip-flop 405 remains high and gate 407 remains enabled. If the system is out of sync, the Q output of flip-flop 405 will go low, disabling gate 407 and interrupting the FIFO's output clock. One clock period later, $\overline{FR+1}$ is used to set flip-flop 405 and re-enable the FIFO output clock. Thus, one clock has been withheld from the FIFO output, causing the effective loop delay to be lengthened by 1 bit.

There are two cases to consider: too few bits in the FIFO, and too many bits in the FIFO.

If there are too few bits of delay in the FIFO (i.e., the loop is too short), when the loop length is increased by one bit per frame until synchronization is achieved. For example, if a station is removed from the loop, the system requires one frame to regain sync.

If there are too many bits of delay in the FIFO (i.e., the loop is too long), the loop length continues to increase by one bit per frame until the FIFO is full. The FIFO full condition is detected by flip-flop 412, which clears the FIFO. The circuit now continues adding one bit of delay per frame, starting with an empty FIFO, until sync is achieved. This case can occur when a station is added to the loop. If there are N bits per frame, it takes N−1 frame times for the system to regain sync if a single station is added. For N=192, and 125 microseconds per frame, this is about 24 msec for the worst case.

The above synchronization procedures are automatically executed when the system is powered up and every time sync is lost. Thus, the FIFO circuit adaptively seeks out the correct loop length and automatically maintains it.

A straightforward modification of this synchronization technique enables its use in a system where the frame bit is inserted as a toggle bit in the data stream. In this case, the output of an exclusive-OR gate would be connected to the D input of flip-flop 405 in FIG. 4. The inputs to this gate are the FIFO output (00 to FIFO 411) and the FRAME signal. This checks that the new frame bit is the opposite of the previous one. Operation of the circuit is the same as before, although on the average it takes twice as long to gain sync.

Another extension of this technique is to detect an out-of-sync condition in one frame and *all* the required bits of delay in the succeeding frame (rather than adding only one bit of delay per frame). This has the advantage of faster operation at the expense of a small amount of additional hardware.

A minor modification allows this technique to be used in systems which have a multi-frame delay around the loop. This may be advantageous since it allows more stations to be connected to the loop. If it is desired to maintain the delay of m frames (each frame having N bits), then a FIFO of capacity mN must be used in conjunction with a frame counter which allows the frame comparison (gate 406) to occur only every $m^{th}$ frame and inhibits it in the intervening frames.

The above discussion has been confined to closed loops but it is understood that our arrangement may be used on a continuous channel for framing control, or used in situations where there is desired to be a fixed time delay between main stations on a channel without regard to the number of stations interposed between the main stations.

We claim:

1. A synchronization circuit for use in a digital communication system, said system having a plurality of serially interconnected stations, said stations arranged for intercommunication via a digital data channel, said channel divided into frames with each frame having n bit positions, said synchronization circuit comprising means for generating a frame synchronizing bit and for placing said synchronizing bit in each frame on said digital data channel a FIFO register for insertion in said digital channel between any two of said stations so that said bits of each said frame as well as said frame synchronization bit pass from an input to an output of said FIFO, a first clock for controlling said bits into said FIFO one bit at a time a second clock for controlling said bits out of said FIFO one bit at a time means for comparing the frame synchronizing bit of a particular frame at the output of said FIFO with a generated frame synchronizing bit of a next frame on said digital data channel, and means responsive to a mismatch between said compared bits for inhibiting said second clock so as to inhibit the clocking of one bit out of said FIFO while still allowing one bit to be clocked into said FIFO by said first clock.

2. The invention set forth in claim 1 wherein said system is divided into separate parallel channels each said channel passing through said common synchronization circuit, and wherein said frame synchronizing bit is on one channel and data bits are on a separate channel.

3. The invention set forth in claim 1 wherein said system is a closed loop system.

4. A synchronization circuit for use in a digital communication system, said system having a plurality of serially interconnected stations, said stations arranged for intercommunication via a digital data channel, said channel divided into frames with each frame having n bit positions, each $M^{th}$ frame having at least one frame bit on said one channel said synchronization circuit comprising a FIFO register having bit length Mn, said FIFO arranged for insertion in said digital channel between any two of said stations so that said bits of each said frame pass from an input to an output of said FIFO, a first clock for controlling bits into said FIFO one bit at a time, a second clock for controlling bits out of said FIFO one bit at a time, means for comparing the frame bit of each frame at the output of said FIFO with a subsequent frame bit on said digital channel, and means responsive to each mismatch between said compared bits for inhibiting the clocking one bit out of said FIFO while one bit is clocked into said FIFO.

5. The invention set forth in claim 4 wherein said system is a closed loop system.

6. An adaptive synchronization circuit for use in a digital communication system, said system having m serially interconnected data units, said units arranged for intercommunication via a digital data channel, said channel divided into frames with each frame having n bits positions, each said frame having at least one frame bit placed on said data channel, said synchronization circuit comprising a FIFO register having bit length at least $n-m$, said FIFO arranged for insertion in said digital channel between any two of said units so that said bits of each said frame pass from an input to an output of said FIFO, means for clocking bits into said FIFO, means for clocking the bits out of said FIFO, means for comparing the frame bit of each frame at the output of said FIFO with a subsequent frame bit on said digital channel, and means responsive to each mismatch between said compared bits for inhibiting the clocking of one bit out of said FIFO.

7. A synchronization circuit for use in a digital communication system, said system having a plurality of serially interconnected stations, said stations arranged for intercommunication via a digital data channel, said channel divided into frames with each frame having n bit positions, said synchronization circuit comprising means for generating a frame synchronizing bit and for placing said synchronizing bit in each frame on said digital data channel at least two FIFO registers, each FIFO register arranged for insertion in said digital channel between any two of said stations so that said bits of each said frame pass from an input on an output of at least one of said FIFO registers, and said frame synchronization bits pass from an input to an output of a second one of said registers, a first clock for controlling said bits into said FIFO registers one bit at a time a second clock for controlling said bits out of said FIFO registers one bit at a time means for comparing the frame synchronization bit of a particular frame at the output of said second FIFO register with a generated frame synchronizing bit of a next frame on said digital data channel, and means responsive to a mismatch between said compared bits for inhibiting said second clock so as to inhibit the clocking of one bit out of said FIFO registers while still allowing one bit to be clocked into said FIFO registers by said first clock.

* * * * *